United States Patent [19]

Nakayama et al.

[11] Patent Number: 5,920,893
[45] Date of Patent: Jul. 6, 1999

[54] STORAGE CONTROL AND COMPUTER SYSTEM USING THE SAME

[75] Inventors: Shinichi Nakayama, Odawara; Shizuo Yokohata, Kanagawa-ken, both of Japan

[73] Assignee: Hitachi, Ltd., Tokyo, Japan

[21] Appl. No.: 08/867,191

[22] Filed: Jun. 2, 1997

[30] Foreign Application Priority Data

Jun. 4, 1996 [JP] Japan .................................. 8-163927

[51] Int. Cl.⁶ .................................................. G06F 12/00
[52] U.S. Cl. ...................... 711/147; 711/147; 711/163; 711/170; 711/206; 395/494; 395/878; 395/200.08; 360/48; 360/369
[58] Field of Search ................................. 711/147, 163, 711/170, 206; 395/494, 878, 200.08; 360/48, 369

[56] References Cited

U.S. PATENT DOCUMENTS

| | | | |
|---|---|---|---|
| 5,206,939 | 4/1993 | Yanai et al. | 395/400 |
| 5,581,743 | 12/1996 | Burton et al. | 395/500 |
| 5,664,144 | 9/1997 | Yanai et al. | 711/113 |
| 5,724,542 | 3/1998 | Taroda et al. | 711/113 |
| 5,778,349 | 7/1998 | Okonogi | 707/1 |

FOREIGN PATENT DOCUMENTS

| | | |
|---|---|---|
| 60-254270 | 12/1985 | Japan . |
| 63-211019 | 9/1988 | Japan . |
| 1-309117 | 12/1989 | Japan . |
| 03256945 | 11/1991 | Japan . |

*Primary Examiner*—Tod R. Swann
*Assistant Examiner*—Nasser Moazzami
*Attorney, Agent, or Firm*—Antonelli, Terry, Stout & Kraus, LLP

[57] ABSTRACT

A storage control enables data on various storage media to be shared among host computers having various different host computer input/output interfaces. A control processor checks a host computer interface management table when write is requested by a host computer (HCP). The control processor writes write data in a cache slot of the cache memory without converting the format if the data format of the HCP is in an FBA format and it converts the format into the FBA format and writes it when the data format of HCP is in a CKD format. The processor checks a table when read is requested by HCP. If the data format of HCP is FBA, the processor transfers the read data read from the cache slot without converting it and if it is CKD, the processor converts the format into the FBA format and transfers the format converted data. The control processors, retrieve write data in the cache memory and writes it in a drive.

19 Claims, 9 Drawing Sheets

DRIVE CONTROL BLOCK (DCB)

HOST COMPUTER INTERFACE MANAGEMENT INFORMATION TABLE

| CONTROL PROCESSOR No. | INTERFACE INFORMATION |
|---|---|
| 305 | CKD FORMAT |
| 306 | FBA FORMAT |

STORAGE CONTROL AND COMPUTER SYSTEM USING THE SAME

BACKGROUND OF THE INVENTION

The present invention relates to a storage control and in particular to a storage control system which enables data on various storage media for storing input/output data to/from host computers to be shared among said host computers having various host computer input/output interfaces; and a computer system using the same.

Recently cases have been increased in which main frames are linked with a division system of an open system bases, such as downsizing of part of operations (transactions, jobs) which used to be processed by a main frame to a division server (for example, UNIX server, etc.) or incorporation of an information system into a division.

In these cases, due to the fact that the data format (CKD format) of the main frame is different from the data format (FBA format) of the host computer input/output interface of the UNIX server, development of programs for data conversion and data conversion between host computers is required or a storage control devoted to each host computer input/output interface is necessary. This makes it difficult to build a wide range of computer system configurations.

As one of methods which have been devised in order to overcome the above-mentioned problems, an integrated computer system which enables various programs to be executed without limiting the CPU (central processing unit) architecture by adopting, for example, a hardware configuration including a plurality of computers in one system is disclosed in JP-A-60-254270.

A magnetic disk device including an interface which is compatible to a plurality of different interface standards and an interface conversion control circuit which enables files on a magnetic disk to be shared is disclosed in JP-A-1-309117.

SUMMARY OF THE INVENTION

In the prior art technology which is disclosed in the above-mentioned JP-A-60-254270, CPUs having different architectures have a master-slave relationship with each other. The CPU on the other slave side having different architecture is exclusively prevented to simultaneously use the storage medium in order that the CPU on the slave side is selected by a hardware switch to occupy a system bus for executing an input/output operation to/from the storage medium. Accordingly when the selected CPU is used for an extended period of time, a disadvantage occurs that the storage medium and/or the system bus which are resources common to the system would be occupied for an extended period of time.

Since files in the magnetic disk device are divided and stored for each of CPU sharing different architectures, it is impossible to share the same file in the magnetic disk device among CPUs having different architectures.

Although it is possible for host computers having different architectures to share a storage medium in the prior art as mentioned above, the storage medium is exclusively used among host computers having different architectures. This may partly cause the utilization efficiency of the file subsystem to be remarkably lowered. The disadvantage that data sharing among host computers having different host computer input/output interfaces is not overcome.

Although file sharing among host devices having different interfaces is possible in the above-mentioned JP-A-1-309117, data sharing among different interfaces is not mentioned.

It is an object of the present invention to provide a storage control in which a request of data access to a storage medium from host computers having different host computer input/output interfaces is made possible by conducting data conversion if it is necessary for such a request and in which sharing of data on the storage medium among host computers having different host computer input/output interfaces is made possible whereby extensibility of file subsystem and responsiveness of data is enhanced to enable a wide rage of computer system configurations to be built.

It is another object of the present invention to provide a storage control which enables various host computer input/output interfaces and/or various storage medium input/output interfaces to be added to or removed from the storage control.

It is a further object of the present invention to provide a computer system including the above-mentioned storage control.

In order to accomplish the above-mentioned object, in an aspect of the present invention there is provided a storage control in a computer system including a plurality of host computers having various different host computer input/output interfaces, the storage control for controlling input/output to/from the host computers, and various storage media for storing input/output data of the host computers, wherein the storage control is made up of: control processors, each being connected to one of host computers; device input/output interfaces, each for one of storage media, for connecting the control processors with the various storage media to input/output data in a predetermined format to/from each storage medium; and a host interface management table for managing the data format of the host computer interface of each host computer;

each of the control processors includes a data format converting unit which compares the data format of corresponding host computer in the host computer interface managing table with the predetermined data format when a write data request is issued from the corresponding host computer, convertes the data format of the write data into the predetermined data format, writes the converted write data in the storage medium when the compared formats match with each other and writes the write data without converting the data format of the write data when they do not match with each other, and which also compares the data format of the corresponding host computer in the host computer interface managing table with the predetermined data format when a read data request is issued from the corresponding host computer, converts the data format of the read data read from the storage medium into the predetermined data format to transfer the converted read data to the corresponding host computer when the compared formats do not match with each other and transfers the read data to the corresponding host computer without converting the data format of the read data when they match with each other. This configuration enables data on various storage media to be shared among host computers having different host computer input/output interfaces.

In a computer system having the storage control of the above-mentioned configuration, addition or removal of one or more host computers having desired kinds of host computer input/output interfaces and one or more control processors compatible to the host computers is made possible by updating the host computer interface managing table.

In accordance with one feature of the present invention, drive control blocks (DCB), each for one of storage devices (drives) are provided for controlling the access to each storage device. This enables various storage devices having a given device input/output interface to be added or removed.

DESCRIPTION OF THE PREFERRED EMBODIMENTS

Now, the embodiments of the present invention will be described in detail with reference to drawings.

Figure 1:
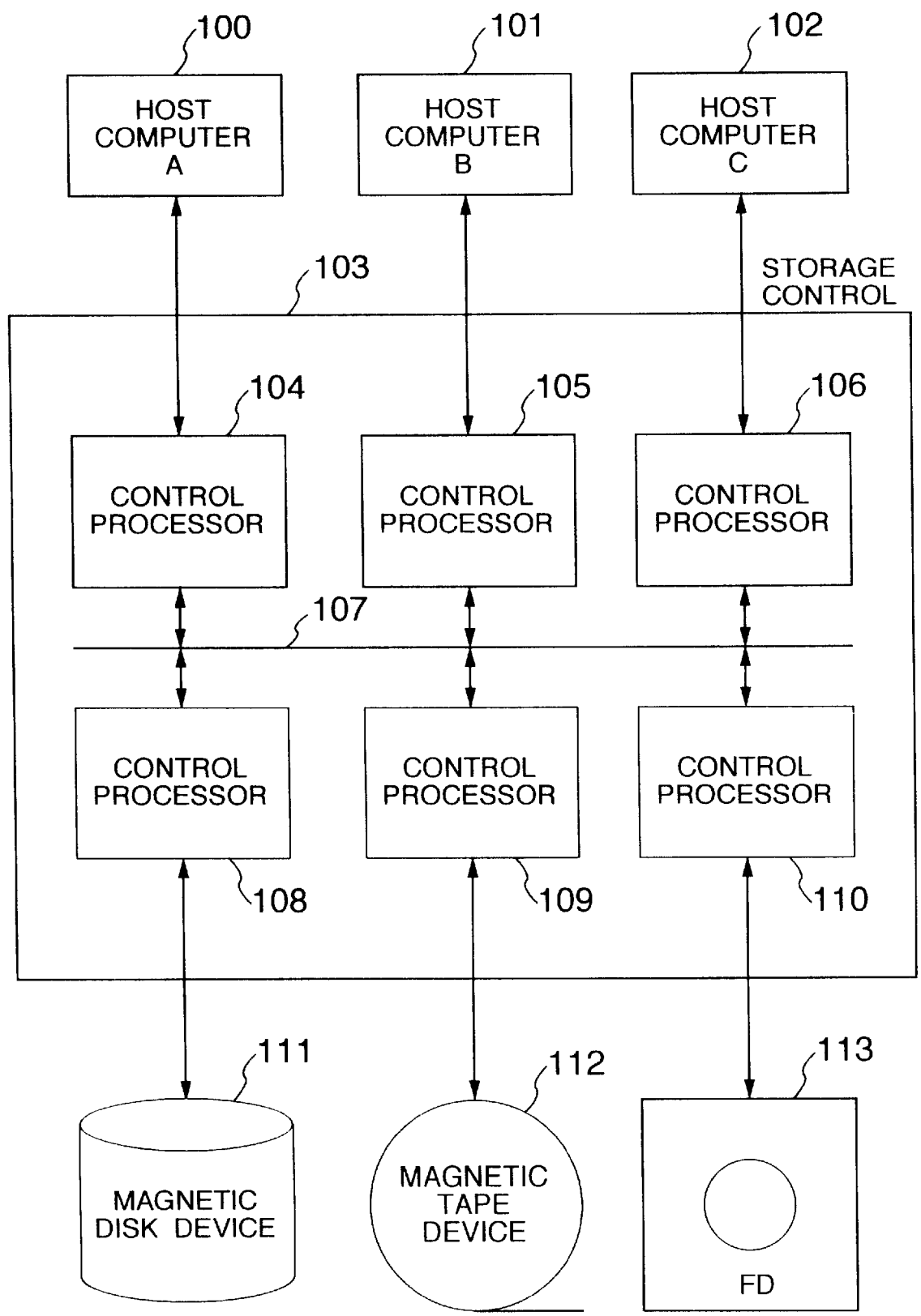
FIG. 1 is a schematic block diagram showing one embodiment of a computer system of the present invention.

FIG. 1 is a block diagram which is useful for explaining the principle of the operation of the present invention and showing the configuration of an embodiment of a computer system of the present invention which comprises a plurality of host computers having various different input/outputs therefor, a storage control for controlling the input/output to/from the host computers and various storage media for storing therein input/output data to/from the host computers.

In FIG. 1, the plurality of host computers A100, B101 and C102 having various different host computer input/output interfaces are connected to a magnetic disc device 111, magnetic tape device 112 and floppy disk device 113 via a storage control 103.

Control processors 104, 105, 106, 108, 109 and 110 which are incorporated in the storage control 103 are adapted to control the transfer of data among the host computers A100, B101 and C102 and the magnetic disk device 111, magnetic tape device 112 and the floppy disk device 113.

In other words, the control processors 104, 105 and 106 execute an input/output data transfer request from the host computers A100, B101 and C102 and the control processors 108, 109 and 110 execute a request of input/output data transfer to the magnetic disk device 111, magnetic tape device 112 and the floppy disk device 113.

All the control processors 104, 105, 106, 108, 109 and 110 receive and transmit data and control signal with each other via a control line 107.

Figure 2:
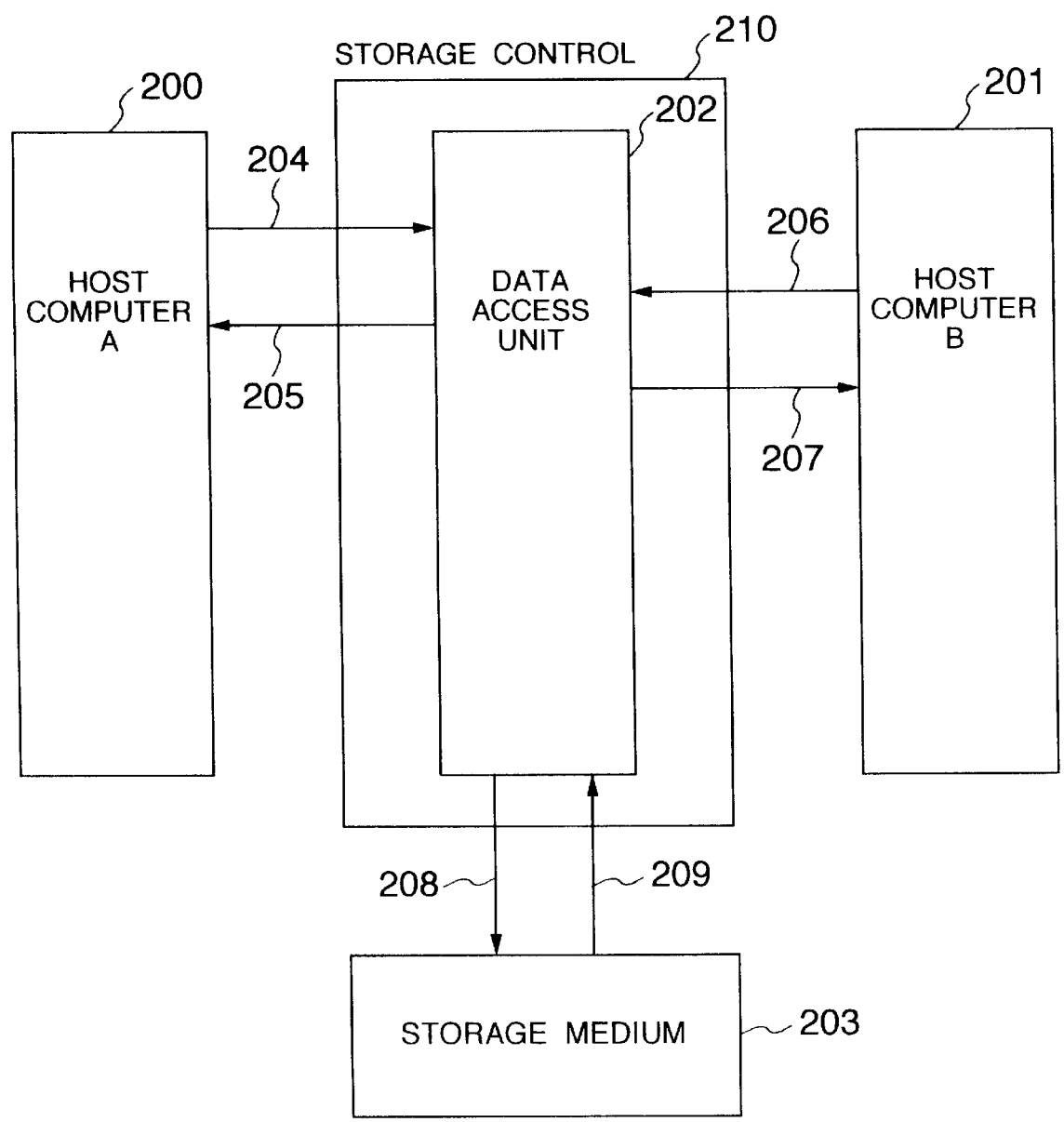
FIG. 2 is a schematic block diagram which is useful for explaining the summary of the present invention.

FIG. 2 is a block diagram for explaining the outline of the present invention. Now, the outline of the present invention will be described with reference to FIG. 2.

In FIG. 2, the host computers A200, B201 having different host computer input/output interfaces and the storage medium 203 are connected to the storage control 210, which includes a data access unit 202. An access request 204 (write), 205 (read), 206 (write) and 207 (read) which are generated by the host computers A200 and B201 to the storage media 203 are issued to the storage control 210. These access requests are executed by the data access unit 202.

If the write access request 204 from the host computer A200 is issued, the data access unit 202 performs data conversion when the data conversion of the write data is necessary and writes converted data on the storage medium 203 and write unconverted write data on the storage medium 203 when the data conversion is not necessary.

If the write access data request 204 is issued from the host computer A200, the data access unit 202 performs data conversion of the write data when it is necessary and writes the converted data on storage medium 203 and writes unconverted write data on the storage medium 203 when the data conversion is not necessary (208).

If the read access request 205 from the host computer A200 is issued, the data access unit 202 reads data from the storage medium and performs data conversion when it is necessary and transfers the converted data to the host computer A and transfers the unconverted read data to the host computer A when the data conversion is not necessary.

Processing for the access request from the host computer B201 is conducted similarly to the processing for the access request from the host computer A200.

The above-mentioned operation enables the host computers having various different host computer input/output interfaces to share the data on the storage medium.

It is to be noted that the number of the host computers having different host computer input/output interfaces is not limited to 2, the three or more host computers may be connected.

Figure 3:
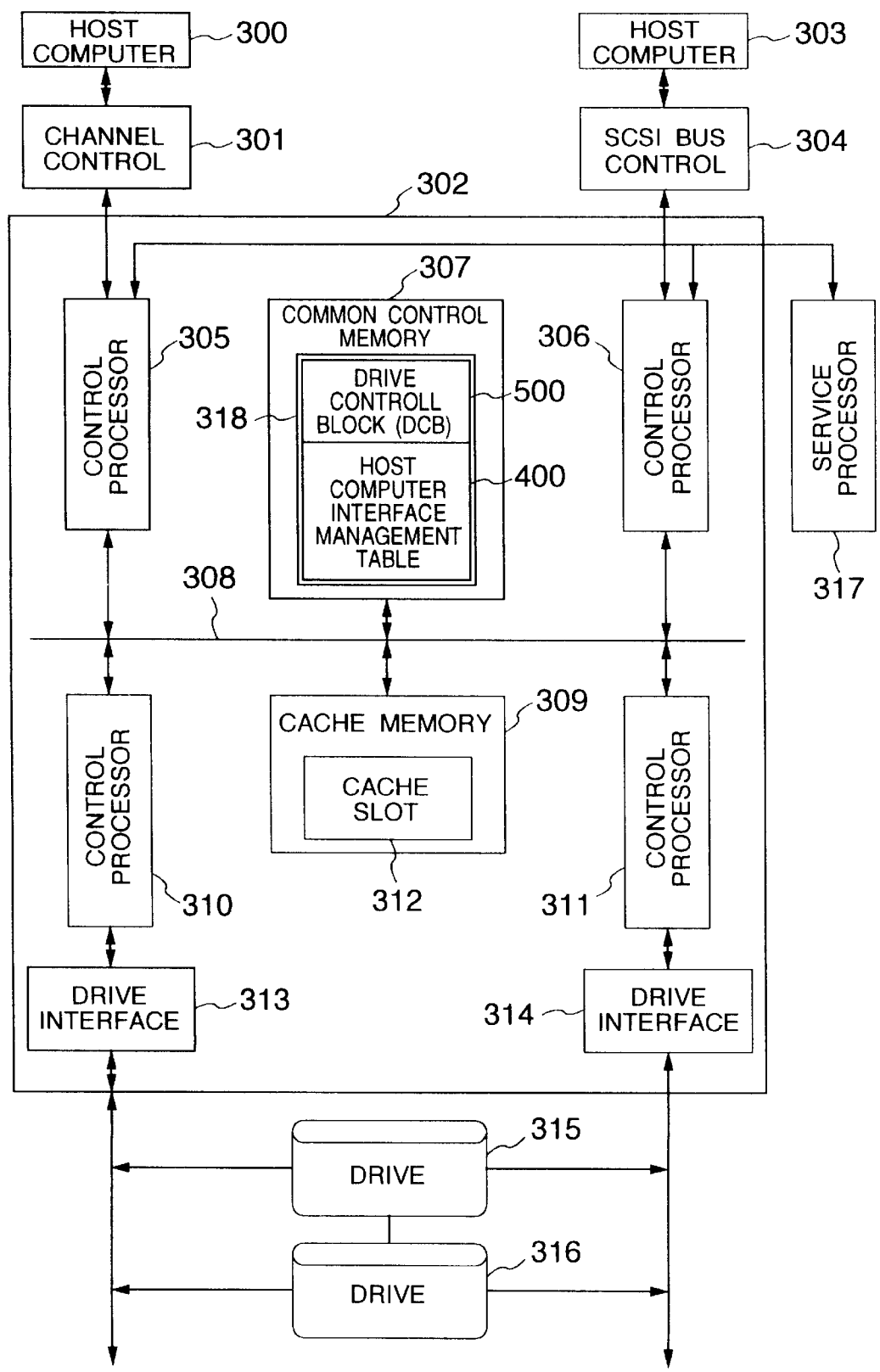
FIG. 3 is a schematic block diagram showing the configuration of another embodiment of a disk subsystem of the present invention.

FIG. 3 is a block diagram showing the configuration of a disk subsystem having a cache memory in another embodiment of the present invention.

In FIG. 3, a disk control 302 is connected to a host computer 300 via a channel control 301 on the host side and is also connected to a host computer 303 via a small computer system interface (abbreviated as SCSI).

In the present embodiment, the host computer 300 is a main frame computer (CKD data format) and the host computer 303 is an UNIX computer (FBA data format).

The disk control 302 is connected to drives 315 and 316 which are magnetic storage medium on the lower side.

The disk control 302 performs read/write of data on the drives 315 and 316 in response to the requests of the host computers 300 and 303.

Data transfer among the host computers 300, 303 and the drives 315, 316 is controlled by the control processors 305, 306, 310 and 311 which are incorporated in the disk control 302.

The control processors 305 and 306 are connected to the host computers 300 and 303 through the channel control 301 and the SCSI bus control 304, respectively and the control processors 310 and 311 are connected to the drives 315 and 316 through the drive interfaces 313 and 314, respectively.

The control processors 305 and 306 mainly perform data transfer between the host computers 300 and 303 and the cache memory 309. The control processors 310 and 311 mainly perform data transfer between the cache memory 309 and the drives 315 and 316.

A common control memory 307 is a common memory which is accessible from all control processors 305, 306, 310 and 311 and stores therein common control information 318 used for allowing the disk control 302 to manage the drives 315 and 316. The common control information 318 will be described hereafter in detail.

The cache memory 309 is accessible from all control processors 305, 306, 310 and 311 and is used for temporarily storing data which is read from the drives 315 and 316. A cache slot 312 is the data management unit quantity in the cache memory 309.

The control processors 305, 306, 310 and 311 receive/transmit data and control signals from/to the cache memory 309 and the common control memory 307 via a signal line 308.

The control processors 305 and 306 are connected to a service processor 317.

When update of the common control information 318 in the common control memory 307 is instructed from the service processor 317, the service processor 317 selects any one of the control processors 305 and 306 to send an update request, so that the selected control processor will update the common control information 318 in the common control memory 307.

Now, the common control information will be described.

The common control information 318 includes a drive control block 400 and host computer interface management information table 500, which will be described in order.

Figures 4, 5:
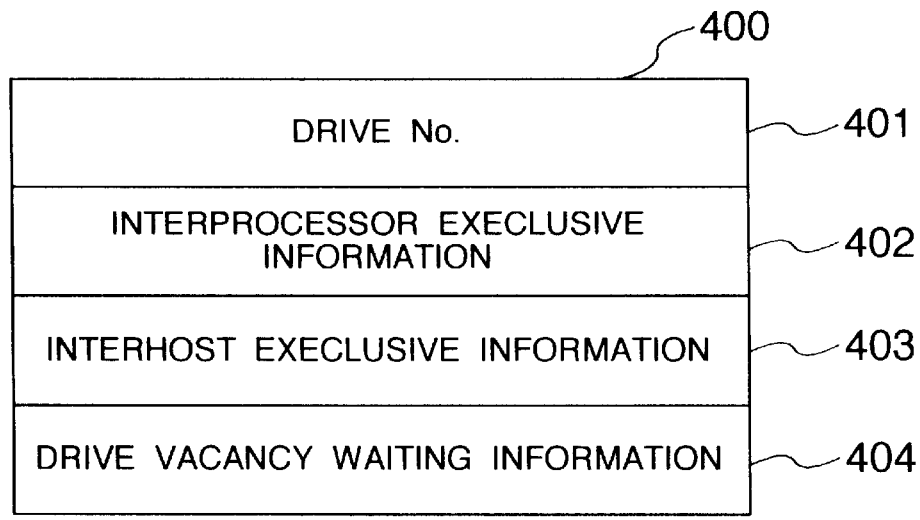
FIG. 4 is a diagram showing the configuration of a drive control block.
FIG. 5 is a diagram showing one example of host computer interface management information.

FIG. 4 shows a drive control block (abbreviated as DCB) 400. One DCB 400 is provided for each one of the drives and stores therein four data.

The four data include a drive number 401 for enabling the disk control 302 to identify each drive, interprocessor exclusive data 402, interhost exclusive information 403 and drive vacancy waiting information 404.

The interprocessor exclusive information 402 is used when the control processor 305 or 306 exclusively controls the DCB access from the other control processor and sets the processor number when the control processor reserves the access right for the DCB having the specified drive number and cancels the processor number when the control processor releases the access right to the DCB.

The interhost exclusive information 403 is used when the host computer 300 or 303 exclusively controls the drive access from the other host computer and sets the information 403 "on" when the processor reserves access of the specified drive number and sets it "off" when the host computer releases the access right.

The drive vacancy waiting information 404 is used to inform one of the host computers 300 and 304 that a DCB having the drive number specified is vacant upon being released from use by the other host computer which has been using the DCB when the one computer requested to reserve the access right for the DCB but was informed of the fact that the DCB was being used by the other host computer.

FIG. 5 shows a host interface management information table 500.

In the table 500, the host interface information 502 is managed for each number 501 of the control processor of a host computer connected. It is determined based upon this information as to whether data conversion is to be conducted.

In the present embodiment, the control processors 305 (503 in FIG. 5) and 306 (504 in FIG. 5) manage the CKD and FBA formats 506 and 507, respectively. The present management information table 500 is set and reset in response to an instruction from the service processor 317.

Now, operation of the control processors 305, 306, 310 and 311 in the disk control 302 in accordance with the present invention will be described.

Figure 6:
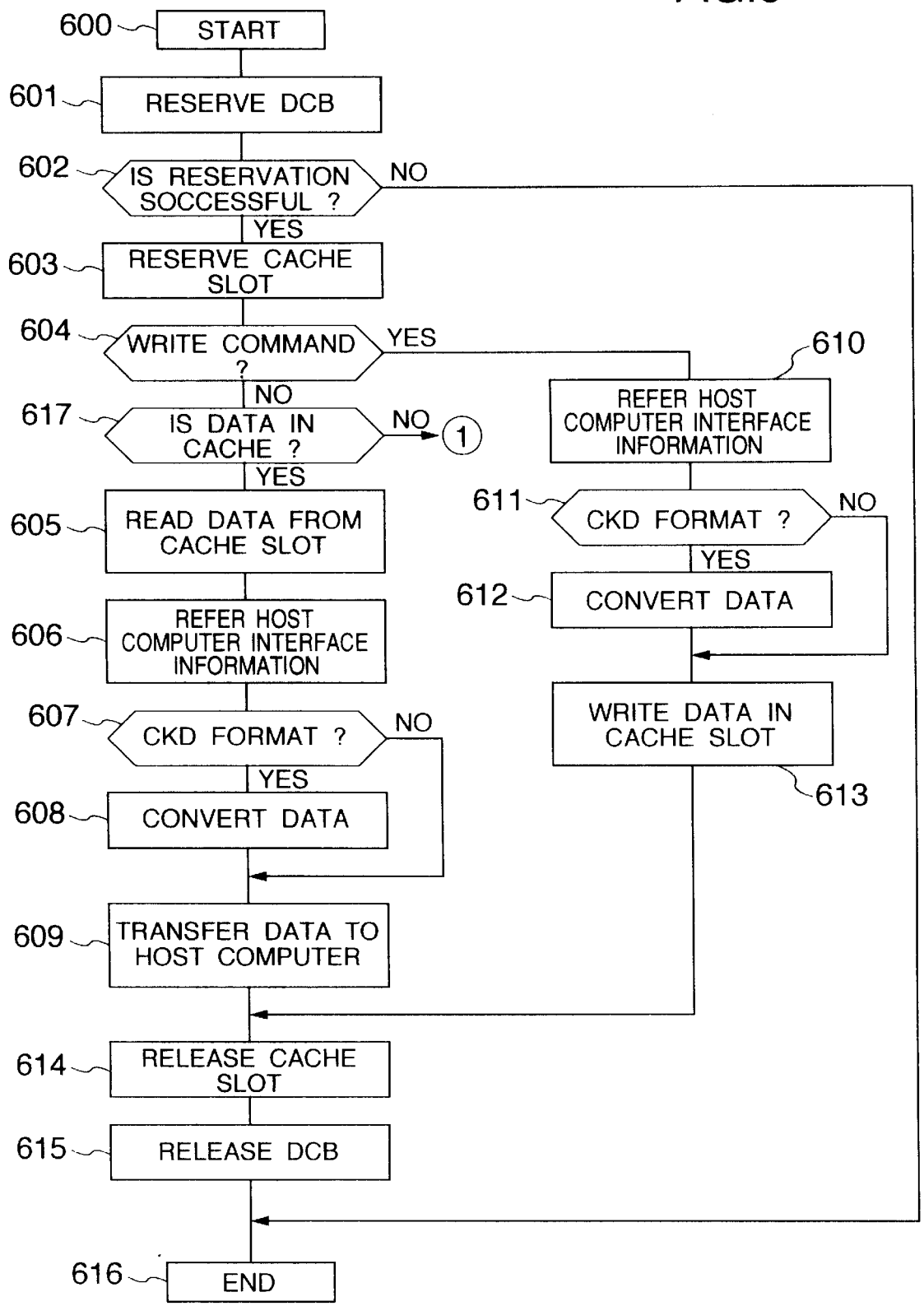
FIG. 6 is a flow chart showing a data access operation.

FIG. 6 is a flow chart showing the main flow of operation which is executed by a data access processing unit (600) including a data format conversion unit.

When a control processor 305 receives a data access command from the host computer 300, DCB processing for reserving the access right for the DCB of the specified drive number is executed (step 601).

A determination as to whether reservation of DCB is succeeded or not is made (step 602). If failed, the data access processing is ended (step 616). If it is successful, following operation will be conducted.

Firstly, reservation of the cache slot is conducted (step 603). Subsequently, a determination is made as to whether or not the data access command is a write command or a read command (step 604).

If it is a write command, operation will be conducted as follows:

With reference to the host computer interface management information table 500 (FIG. 5) (step 610), a determination is made as to whether the host computer interface which is connected to the control processor is in the CKD or FBA format (step 611).

In the present embodiment, the control processors 305 and 306 are in the CKD and FBA formats 506 and 507, respectively.

If it is in the CKD format, the control processor 305 converts CKD data into FBA data (step 612) and thereafter writes the converted write data into the cache slot 312 (step 613). If it is in the FBA format, the control processor 305 writes FBA data into the cache slot 312 without conducting any conversion. Conversion of FBA data into CKD data will be described hereafter Thereafter, the cache slot is released (step 614) and DCB is released (step 615).

If the received command is a read command, operation will be executed as follows:

Firstly, a determination is made as to whether a read data exists in the cache memory (step 617). If the data exists, operation at step 605 and the subsequent steps will be conducted. If no data exists, operation (1) will be conducted.

In the operation (1), the control processors 305 and 306 instruct the control processors 310, 311 to read data from the drives and the control processors 310, 311 read data from the drives via the drive interfaces 313, 314 to write read data in the cache slot of the cache memory. This operation is omitted in the flow chart of FIG. 6.

Now, operation at step 605 and the subsequent steps will be described.

Data on the cache slot 312 is read (step 605).

With reference to the host computer interface management information table 500 (FIG. 5) (step 606), a determination is made as to whether the host computer interface which is connected to the control processor is in the CKD or FBA format (step 607).

If it is in the CKD format, the control processor 305 converts the read data from FBA format into CKD format data (step 608) and transfers the converted data to the host computer 300 (step 609). Conversion of FBD data into CKD data will described later.

If it is in the FBA format, the data which is read out from the cache slot 312 is transferred to the host computer 303 without conducting any conversion.

Subsequently, the cache slot 312 is released (step 614) and DCB is released (step 615).

The write data on the cache slot 312 is written into the drives 315, 316 by the control processors 310, 311 asynchronously with the operation of the host computers 300, 303. In other words, the control processors 310, 311 retrieve the cache memory and when data to be written into the drive is found in the cache memory, it writes the data into the drive.

Figure 7:
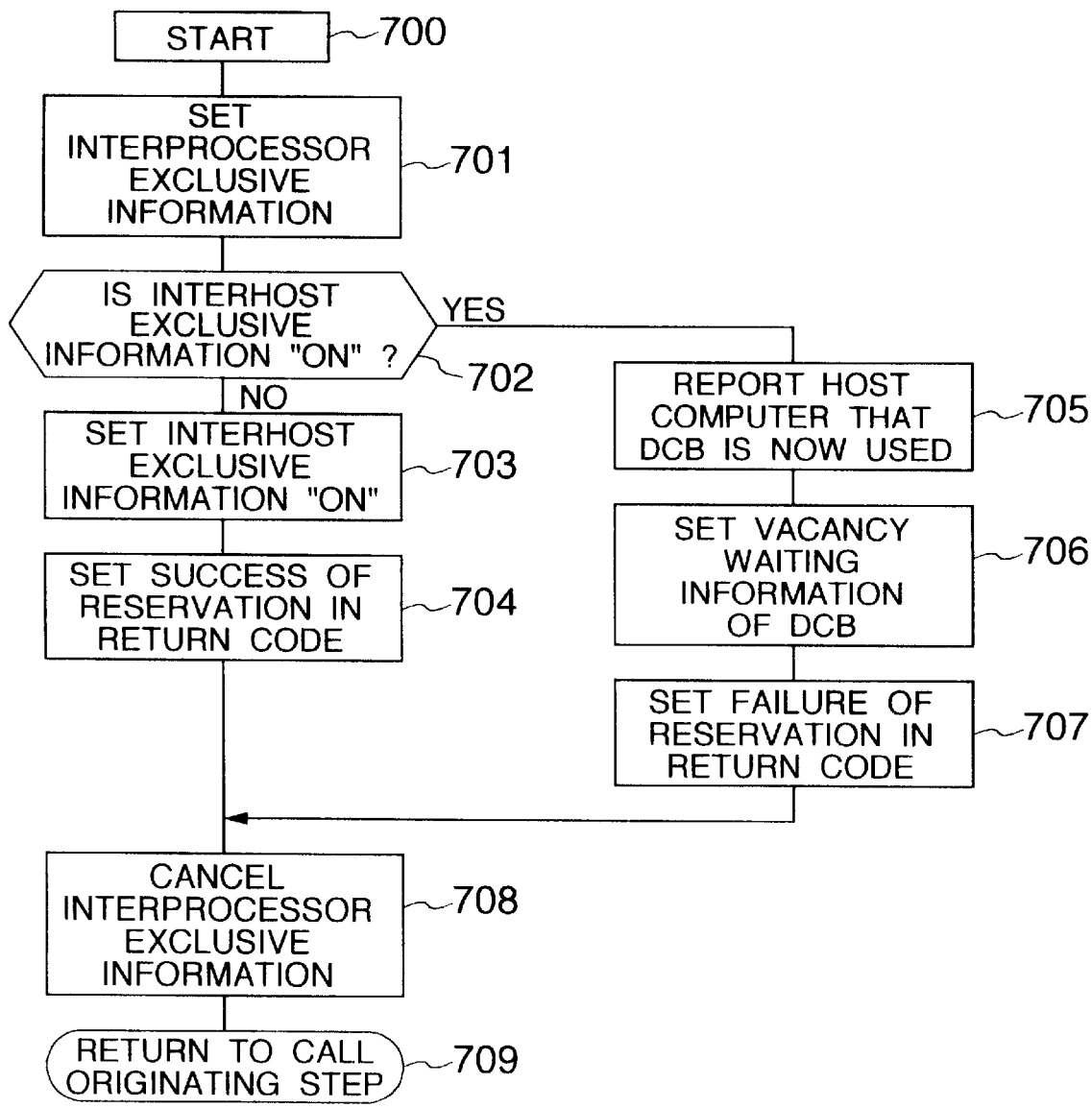
FIG. 7 is a flow chart showing a DCB reserving operation.

FIG. 7 is a flow chart showing the flow (700) of operation in DCB reservation operation (601) in FIG. 6.

Interprocessor exclusive information 402 of the DCB 400 corresponding to the specified drive number 401 is preset (step 701).

Subsequently, a determination is made as to whether the interhost exclusive information is "on" or not (step 702).

If it is not "on", the interhost exclusive information 403 is set "on" (step 703) to set success of reservation in a return code (step 704).

Then, the interprocessor exclusive information 402 is canceled (step 708) to end DCB reservation operation (step 709).

If the interhost exclusive information has already been "on", the operation will be conducted as follows:

The fact that the DCB is being used is reported to the host computer (step 705).

Subsequently, the host computer to which the use of DCB is reported is recorded in the DCB vacancy waiting information 404 of DCB 400 (step 706).

Failure of reservation is set in the return code (step 707) and then the interprocessor exclusive information 401 is canceled (step 708).

Figure 8:
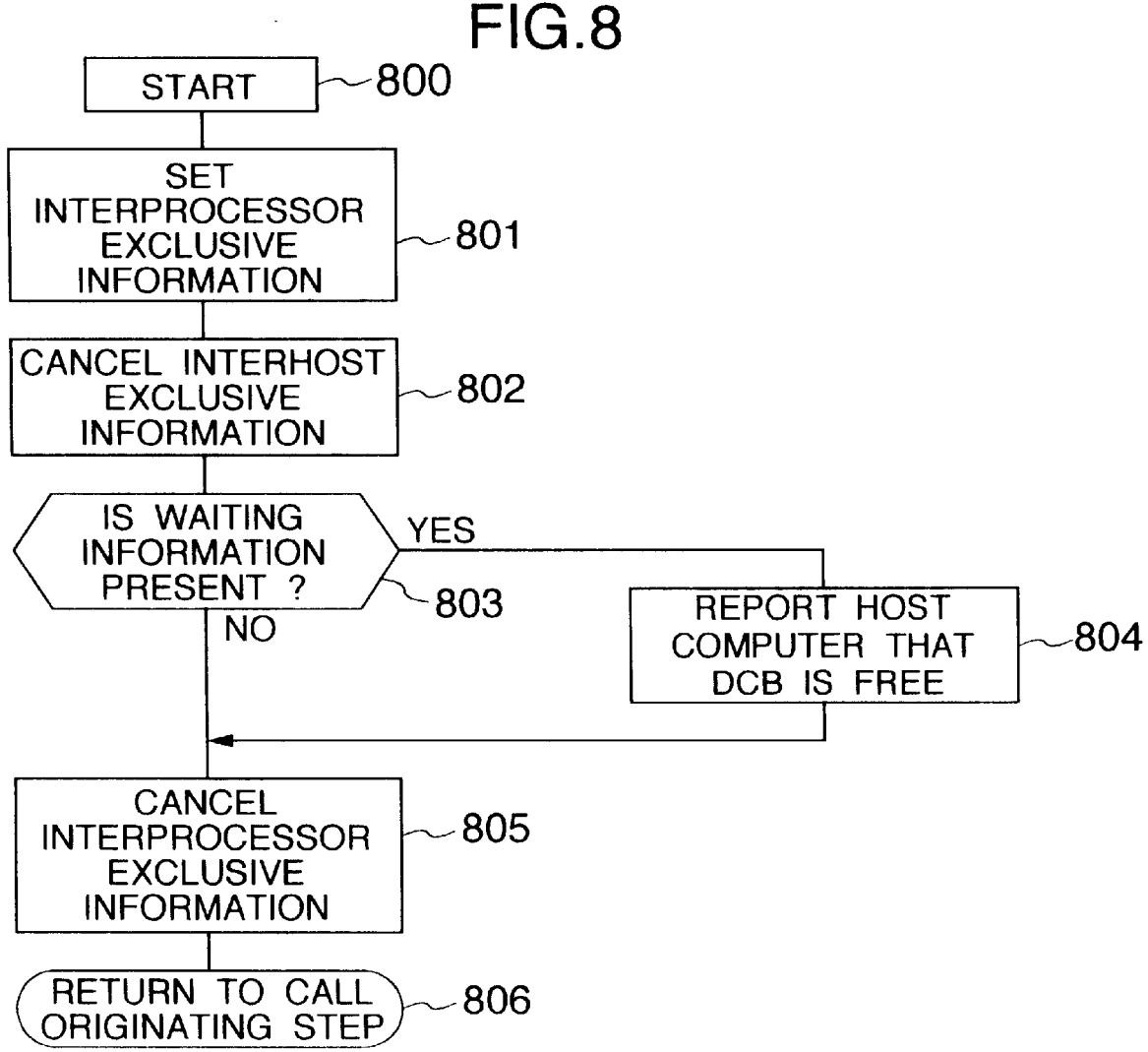
FIG. 8 is a flow chart showing a DCB releasing operation.

FIG. 8 is a flow chart showing the flow of DCB release processing (615) in FIG. 6.

Now, the interprocessor exclusive information 402 of DCB 400 of the drive number 401 in which release is requested is set (step 801).

Then, the interhost exclusive information 403 is canceled (step 802).

Then, a determination is made as to whether a host computer exists, which is registered in the vacancy waiting information of DCB (step 803).

If no host computer exists, the interprocessor exclusive information 402 is canceled (step 605) to end (step 806) the drive release operation (step 800).

If a host computer exists, vacancy of DCB is reported to the registered host computer (step 804).

This prevents the DCB from being predominantly used by either one of the host computers. Then, the interprocessor exclusive information is canceled (step 805).

Figure 9:
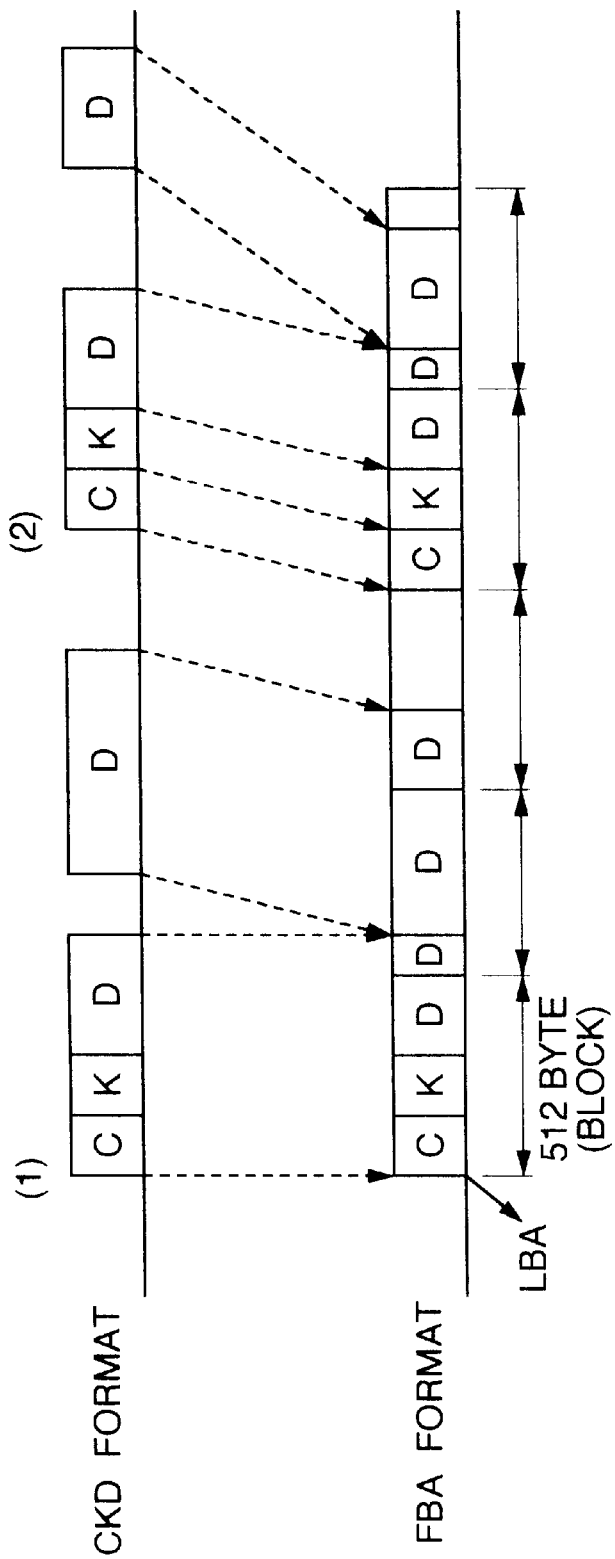
FIG. 9 is a chart useful for illustrating the conversion between CKD and BAD formats.

FIG. 9 is a chart for explaining the conversion between CKD and FBA format data.

Referring now to FIG. 9, conversion from CKD format data to FBA format data will be briefly described.

Information on which block CKD of (1) and (2) are positioned is available. Information on data length of CKD is stored in a C (count) area. In the case of data input/output to/from a host having CKD format, the data length information is divided by 512 bytes to determine the number of necessary blocks. The data is front-packed from the front end of the positioned blocks. The remaining portion of the block is left as it is. In the case of data input/output to/from host computer having FBA format, the specified LBA (Logical Block Address) is accessed from the host computer.

Now, conversion from FBA format data to CKD format data will be described.

In the case of data input/output to/from a host computer having CKD format, a block having the C information of interest is searched and accessed from the specified C information.

In the case of data input/output to/from a host computer having FBA format a block of specified LBA is accessed.

Since the method of conversion is well known, its detailed description will be omitted herein.

Although a magnetic disk device is used as a storage medium in the above-mentioned embodiments, the above-mentioned data access processing can be implemented by using a magnetic tape device or floppy disk device in lieu of magnetic disk device.

The host computers may be added to or removed from the storage control or the computer system for each of control processors for processing a request of input/output of the host computer and control processors for processing input/output to/from the storage media. Further, host computers may be added to or removed from the storage control of a drive (storage) having a device input/output interface. Such an embodiment will be described with reference to FIG. 10. Since components like to those in FIG. 3 are designated by like reference numerals, description of them will be omitted.

Figure 10:
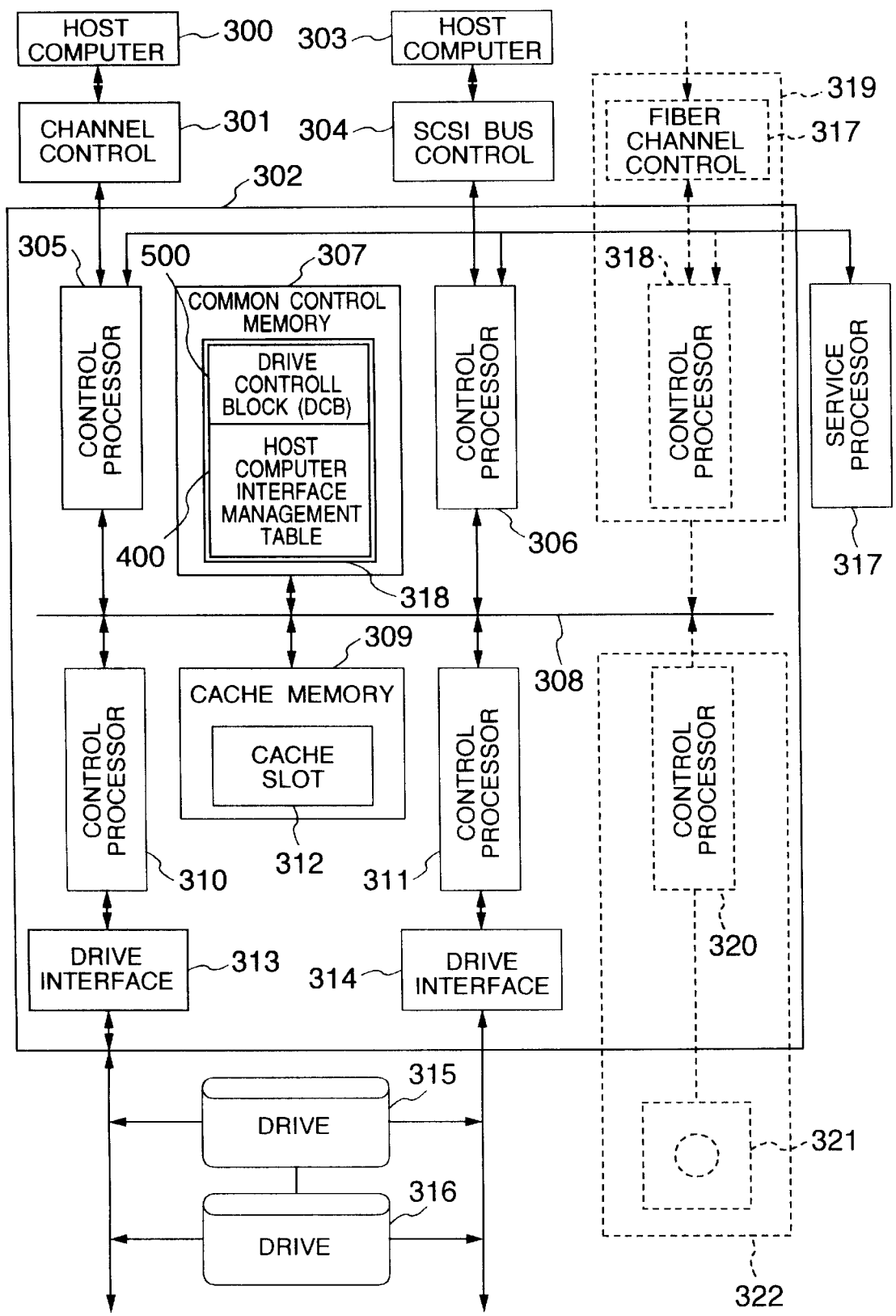
FIG. 10 is a schematic block diagram showing the configuration of a further embodiment of a disk subsystem of the present invention.

In FIG. 10, a pair (319) of a fiber channel control 317 and a control processor 318 for controlling the same are connected (added) to or removed (deleted) from a common bus 308 of the disk control 302.

Further, a pair (322) of a floppy disk (FD) 321 and a control processor 320 for controlling the same are connected (added) to or removed from the common bus 308 of the disk control 302.

The service processor 317 updates the contents of the drive control block 318 in a common memory 307 and the host computer interface management table 319 in response to addition or deletion of the pairs 319 and 322.

In accordance with the present invention, data on storage media can be shared by host computers in which storage controls have various different host computer input/output interfaces as mentioned in the foregoing embodiments. Exensionability of file subsystem and the responsiveness of data is enhanced.

Since host computers having various different host computer input/output interfaces or various storage media for storing input/output data of the host computers can be connected by a single storage control, a wide range of configurations of computer system are possible.

What is claimed is:

1. A storage control for use in a computer system including a plurality of host computers having different kinds of computer input/output interfaces; a storage control for controlling data input/output to/from said host computers; and at least one storage medium having a device input/output interface for conducting data input/output in a given data format for storing input/output data to/from said host computers, said storage control comprising:

a plurality of control processors for controlling the transfer of input/output data to/from the host computers, each of said processors being connected to one of said plurality of host computers; and a management table for managing the data format of the input/output interface of each of said host computer;

each of said control processors including a data format converting unit which, in response to a request of read or write of associated host computer, converts the format of the read or write data into said given data format when the data format from the associated host computer dose not match said given data format and does not convert the format of the read or write data when they match.

2. A storage control as defined in claim 1 in which the content in said management table is set/canceled in response to another processor to allow a desired number of host computers and associated control processors to be added or removed.

3. A storage control as defined in claim 2 and further including a drive control block for managing the state of access to said storage media by said host computers.

4. A storage control as defined in claim 3 in which the number of said storage media is arbitrary changed to allow a desired number of storage media is be added or removed.

5. A storage control as defined in claim 1 and further including a cache memory which is connected to said storage media so that input/output of data is conducted by said host computers via the cache memory.

6. A computer system comprising;

a plurality of host computers having different kinds of computer input/output interfaces; a storage control for controlling data input/output to/from said host computers; and at least one storage medium having a device input/output interface for conducting data input/output in a given data format for storing input/output data to/from said host computers, said storage control including:

a plurality of control processors for controlling the transfer of input/output data to/from the host computers, each of said processors being connected to one of said plurality of host computers; and a management table for managing the data format of the input/output interface of each of said host computer;

each of said control processors including a data format converting unit which, in response to a request of read or write from associated host computer, converts the format of the read or write data into said given data format when the data format of the associated host computer does not match said given data format and does not to convert the format of the read or write data when they match.

7. A computer system as defined in claim 6 in which the content in said management table is set/canceled in response to another processor to allow a desired number of host computers and associated control processors to be added or removed.

8. A computer system as defined in claim 7 and further including a drive control block for managing the state of access to said storage media by said host computers.

9. A computer system as defined in claim 8 in which the number of said storage media is arbitrary changed to allow a desired number of storage media to be added or removed.

10. A computer system as defined in claim 6 and further including a cache memory which is connected to said storage media so that input/output of data is conducted by said host computers via the cache memory.

11. A storage control apparatus for controlling transfer of data between a plurality of host computers and at least one storage medium which stores data of a particular data format said particular data format being the same as a data format used by at least one of said host computers, said storage control apparatus comprising:

a plurality of control processors each controlling transfer of data between one of the host computers and the storage medium, wherein each control processor includes a data format converting unit which, in response to a request to write data in the storage medium from a corresponding host computer, converts the data format of the write data into the particular data format when the data format of the write data does not match the particular data format and does not convert the data format of the write data into the particular data format when the data format of the write data matches the particular data format.

12. A storage control apparatus according to claim 11 wherein each data format converting unit of each control processor, in response to a request to read data in the storage medium from a corresponding host computer, converts the data format of the read data into a data format other than the particular data format used by the corresponding host computer when the data format used by the corresponding host computer does not match the particular data format and does not convert the data format of the read data into the particular data format when the data format used by the corresponding host computer matches the particular data format.

13. A storage control apparatus according to claim 11 further comprising:

a management table for managing information indicating the data format used by each of the host computers, wherein a data format of a host computer is determined by referring to said information.

14. A storage control apparatus according to claim 13, said information stored in said management table is set/cancelled in response to addition or removal of a host computer and a corresponding control processor.

15. A storage control apparatus according to claim 14, further comprising:

a drive control block for managing the state of access to said storage media by said host computers.

16. A storage control apparatus according to claim 15, wherein the number of said storage media is arbitrarily changed to add or remove storage media as desired.

17. A storage control according to claim 11, further comprising:

a cache memory which is connected to said storage media so that input/output of data is conducted by said host computers via the cache memory.

18. A method of controlling transfer of data between a plurality of host computers and at least one storage medium which stores data of a particular data format, said particular data format being the same as a data format used by at least one of said host computers, said method comprising the steps of:

controlling transfer of data between one of the host computers and the storage medium; and in response to a request to write data in the storage medium from a corresponding host computer, converting the data format of the write data into the particular data format when the data format of the write data does not match the particular data format and not converting the data format of the write data into the particular data format when the data format of the write data matches the particular data format.

19. A method according to claim 18 further comprising the step of:

in response to a request to read data in the storage medium from a corresponding host computer, converting the data format of the read data into a data format other than the particular data format used by the corresponding host computer when the data format used by the host computer does not match the particular data format and not converting the data format of the read data into the particular data format when the data format used by the host computer matches the particular data format.

* * * * *